(12) United States Patent
Peleckas et al.

(10) Patent No.: US 11,892,086 B2
(45) Date of Patent: *Feb. 6, 2024

(54) REVOLVER BYPASS VALVE

(71) Applicant: Mueller International, LLC, Atlanta, GA (US)

(72) Inventors: Tomas Peleckas, Decatur, IL (US); Timothy Wayne Stern, Hixson, TN (US); Rock Allen Powell, Jr., Mt. Zion, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,744

(22) Filed: Dec. 9, 2022

(65) Prior Publication Data

US 2023/0108033 A1  Apr. 6, 2023

Related U.S. Application Data

(63) Continuation of application No. 17/149,369, filed on Jan. 14, 2021, now Pat. No. 11,555,547.

(51) Int. Cl.
*F16K 11/07* (2006.01)
*G01F 1/00* (2022.01)
*F16K 11/074* (2006.01)

(52) U.S. Cl.
CPC ............. *F16K 11/074* (2013.01); *G01F 1/00* (2013.01)

(58) Field of Classification Search
CPC .................................................. F16K 11/074
See application file for complete search history.

(56) References Cited

U.S. PATENT DOCUMENTS

| | | | | |
|---|---|---|---|---|
| 2,579,656 A ‡ | 12/1951 | Douglas | ................ | G01F 15/185 73/201 |
| 2,632,328 A ‡ | 3/1953 | McChesney | .......... | G01F 15/185 73/201 |
| 3,238,969 A ‡ | 3/1966 | Champion | .......... | F16K 11/0833 73/201 |
| 3,289,696 A ‡ | 12/1966 | Champion | .............. | F16K 11/08 137/599.13 |

(Continued)

OTHER PUBLICATIONS

Huffman, Jeffrey Allen; Final Office Action for U.S. Appl. No. 16/887,922, filed May 29, 2020, dated May 17, 2022, 18 pgs.‡

(Continued)

*Primary Examiner* — Kevin R Barss
(74) *Attorney, Agent, or Firm* — Taylor English Duma LLP

(57) ABSTRACT

A bypass valve includes a base defining a base sealing surface, the base defining an upstream utility bore, a downstream utility bore, a meter inlet bore, and a meter outlet bore each extending into the base sealing surface; and a selector defining a selector sealing surface and a front surface, a primary passage and a secondary passage defined within the selector between the selector sealing surface and the front surface, the primary passage being isolated from the secondary passage, the selector defining at least one primary passage bore extending into the selector sealing surface and connected in fluid communication with the primary passage, the selector defining at least one secondary passage bore extending into the selector sealing surface and connected in fluid communication with the secondary passage.

20 Claims, 13 Drawing Sheets

(56) References Cited

U.S. PATENT DOCUMENTS

| | | | | |
|---|---|---|---|---|
| 3,387,632 | A ‡ | 6/1968 | Grove | G01F 15/005 251/367 |
| 4,602,657 | A ‡ | 7/1986 | Anderson, Jr. | G01F 15/185 73/1.61 |
| 4,786,409 | A ‡ | 11/1988 | Miller | B01D 35/12 210/450 |
| 4,821,772 | A ‡ | 4/1989 | Anderson, Jr. | F16K 11/08 137/625.46 |
| 7,347,219 | B2 ‡ | 3/2008 | Gohde | F16K 11/20 73/201 |
| 10,247,594 | B2 ‡ | 4/2019 | Smith | G01F 15/185 |
| 11,555,547 | B2 | 1/2023 | Peleckas et al. | |
| 11,619,312 | B2 | 4/2023 | Peleckas et al. | |
| 11,674,605 | B2 | 6/2023 | Huffman | |
| 11,802,624 | B2 | 10/2023 | Peleckas et al. | |
| 2005/0022872 | A1 ‡ | 2/2005 | Robison | F16K 17/30 137/460 |
| 2007/0089791 | A1 ‡ | 4/2007 | Gohde | F16K 11/20 137/613 |
| 2013/0263951 | A1 ‡ | 10/2013 | Gardner | F16K 5/0668 137/625.11 |
| 2018/0313682 | A1 ‡ | 11/2018 | Smith | F16K 11/065 |
| 2018/0372235 | A1 ‡ | 12/2018 | Smith | F16K 11/0853 |
| 2020/0149945 | A1 ‡ | 5/2020 | Yaklin | G01F 15/005 |
| 2021/0207986 | A1 ‡ | 7/2021 | Smith | G01F 15/185 |
| 2021/0372534 | A1 ‡ | 12/2021 | Huffman | F16K 11/07 |
| 2022/0221068 | A1 | 7/2022 | Peleckas et al. | |
| 2022/0221070 | A1 ‡ | 7/2022 | Peleckas | F16K 11/0743 |
| 2023/0194006 | A1 | 6/2023 | Peleckas et al. | |

OTHER PUBLICATIONS

Huffman, Jeffrey Allen; Non-Final Office Action for U.S. Appl. No. 16/887,922, filed May 29, 2020, dated Oct. 13, 2022, 25 pgs.‡

Peleckas, Tomas; Requirement for Restriction/Election for U.S. Appl. No. 17/149,439, filed Jan. 14, 2021, dated Sep. 27, 2022, 6 pgs.‡

Huffman, Jeffrey Allen; Advisory Action for U.S. Appl. No. 16/887,922, filed May 29, 2020, dated Aug. 9, 2022, 4 pgs.‡

Peleckas, Tomas; Notice of Allowance for U.S. Appl. No. 17/149,439, filed Jan. 14, 2021, dated Nov. 28, 2022, 21 pgs.‡

Huffman, Jeffrey Allen; Non-Final Office Action for U.S. Appl. No. 16/887,922, filed May 29, 2020, dated Nov. 15, 2021, 33 pgs.‡

Huffman, Jeffrey Allen; Applicant-Initiated Interview Summary for U.S. Appl. No. 16/887,922, filed May 29, 2020, dated Mar. 3, 2023, 3 pgs.

Huffman, Jeffrey Allen; Final Office Action for U.S. Appl. No. 16/887,922, filed May 29, 2020, dated Jan. 20, 2023, 16 pgs.

Huffman, Jeffrey Allen; Final Office Action for U.S. Appl. No. 16/887,922, filed May 29, 2020, dated Jun. 17, 2022, 18 pgs.

Peleckas, Tomas; Applicant-Initiated Interview Summary for U.S. Appl. No. 17/419,369, filed Jan. 14, 2021, dated Aug. 29, 2022, 2 pgs.

Peleckas, Tomas; Non-Final Office Action for U.S. Appl. No. 17/149,369, filed Jan. 14, 2021, dated Jun. 1, 2022, 27 pgs.

Peleckas, Tomas; Notice of Allowance for U.S. Appl. No. 17/149,369, filed Jan. 14, 2021, dated Sep. 15, 2022, 11 pgs.

Huffman, Jeffrey Allen; Notice of Allowance for U.S. Appl. No. 16/887,922, filed May 29, 2020, dated Apr. 5, 2023, 12 pgs.

Peleckas, Tomas; Notice of Allowance for U.S. Appl. No. 18/113,426, filed Feb. 23, 2023, dated Sep. 11, 2023, 18 pgs.

‡ imported from a related application

REVOLVER BYPASS VALVE

CROSS-REFERENCE TO RELATED APPLICATIONS

This application is a continuation of U.S. application Ser. No. 17/149,369, filed Jan. 14, 2020, which is hereby incorporated by reference in its entirety.

TECHNICAL FIELD

This disclosure relates to valves. More specifically, this disclosure relates to a bypass valve for utility meters.

BACKGROUND

In many areas, public utilities pipe various fluids directly to homes, businesses, and other establishments. Common utility fluids include liquids, such as water, and gases, such as natural gas. These fluids are commonly distributed by large infrastructure networks, and a meter is positioned at each point of consumption, such as a home, business, or other establishment, to monitor how much the location consumes. The meters are commonly positioned directly inline on branched piping coming off of a main infrastructure pipeline.

If an inline meter needs to be taken out of service for any reason, the utility flow to the point of consumption must be interrupted while the meter is physically disconnected from the upstream and downstream piping. During this period, the affected point of consumption will not have access to the utility product carried by that line. Disrupting service of a natural gas line also poses additional problems. Many gas-powered appliances, such as water heaters or fire places, have a pilot light that stays on at all times during normal operation. If the flow of natural gas is disrupted to the point of consumption, the pilot lights will go out. If the flow of natural gas is resumed to the point of consumption and the pilot light is not turned off or relit, natural gas will flow out of the appliance through the unlit pilot light, and the natural gas can accumulate indoors. This accumulation of gas can cause fire and explosion risks. Accordingly, the flow of natural gas to the point of consumption cannot be cut off and later resumed without having access to the appliances indoors, which can make servicing of utility meters difficult to plan for utility companies because they must coordinate with the customer to provide access to the affected appliances.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a bypass valve comprising a base defining a base sealing surface, the base defining an upstream utility bore, a downstream utility bore, a meter inlet bore, and a meter outlet bore each extending into the base sealing surface; and a selector defining a selector sealing surface and a front surface, a primary passage and a secondary passage defined within the selector between the selector sealing surface and the front surface, the primary passage being isolated from the secondary passage, the selector defining at least one primary passage bore extending into the selector sealing surface and connected in fluid communication with the primary passage, the selector defining at least one secondary passage bore extending into the selector sealing surface and connected in fluid communication with the secondary passage, the selector being rotatable relative to the base about and between a meter position and a bypass position, the upstream utility bore connected in fluid communication through the selector to the meter inlet bore in the meter position, the upstream utility bore connected in fluid communication through the selector to the downstream utility bore in the bypass position.

Also disclosed is a utility metering system comprising an upstream utility line; a downstream utility line; a meter comprising a meter inlet and a meter outlet, the meter configured to measure a fluid flow through the meter; and a bypass valve comprising a base defining an upstream utility bore connected in fluid communication with the upstream utility line; a downstream utility bore connected in fluid communication with the downstream utility line; a meter inlet bore connected in fluid communication with the meter inlet; and a meter outlet bore connected in fluid communication with the meter outlet; and a selector defining a primary passage and a secondary passage, the selector rotatable relative to the base about and between a meter position and a bypass position, the selector defining a primary passage and a secondary passage, the primary passage connecting the upstream utility bore in fluid communication with the meter inlet bore and the secondary passage connecting the downstream utility bore in fluid communication with the meter outlet in the meter position, the secondary passage connecting the upstream utility bore in fluid communication with the downstream utility bore in the bypass position.

Also disclosed is a method for routing a fluid flow through a utility metering system comprising positioning a selector of a bypass valve in a meter position, an upstream utility line of the utility metering system connected in fluid communication with an upstream utility bore defined by a base of the bypass valve, a downstream utility line of the utility metering system connected in fluid communication with a downstream utility bore defined by the base, a meter inlet of a meter of the utility metering system connected in fluid communication with a meter inlet bore defined by the base, a meter outlet of the meter of the utility metering system connected in fluid communication with a meter outlet bore defined by the base, the selector defining a primary passage and a secondary passage, the primary passage connecting the upstream utility bore in fluid communication with the meter inlet bore in the meter position, the secondary passage connecting the downstream utility bore in fluid communication with the meter outlet bore in the meter position; and rotating the selector relative to the base to position the selector in a bypass position, the secondary passage connecting the upstream utility bore in fluid communication with the downstream utility bore in the bypass position.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
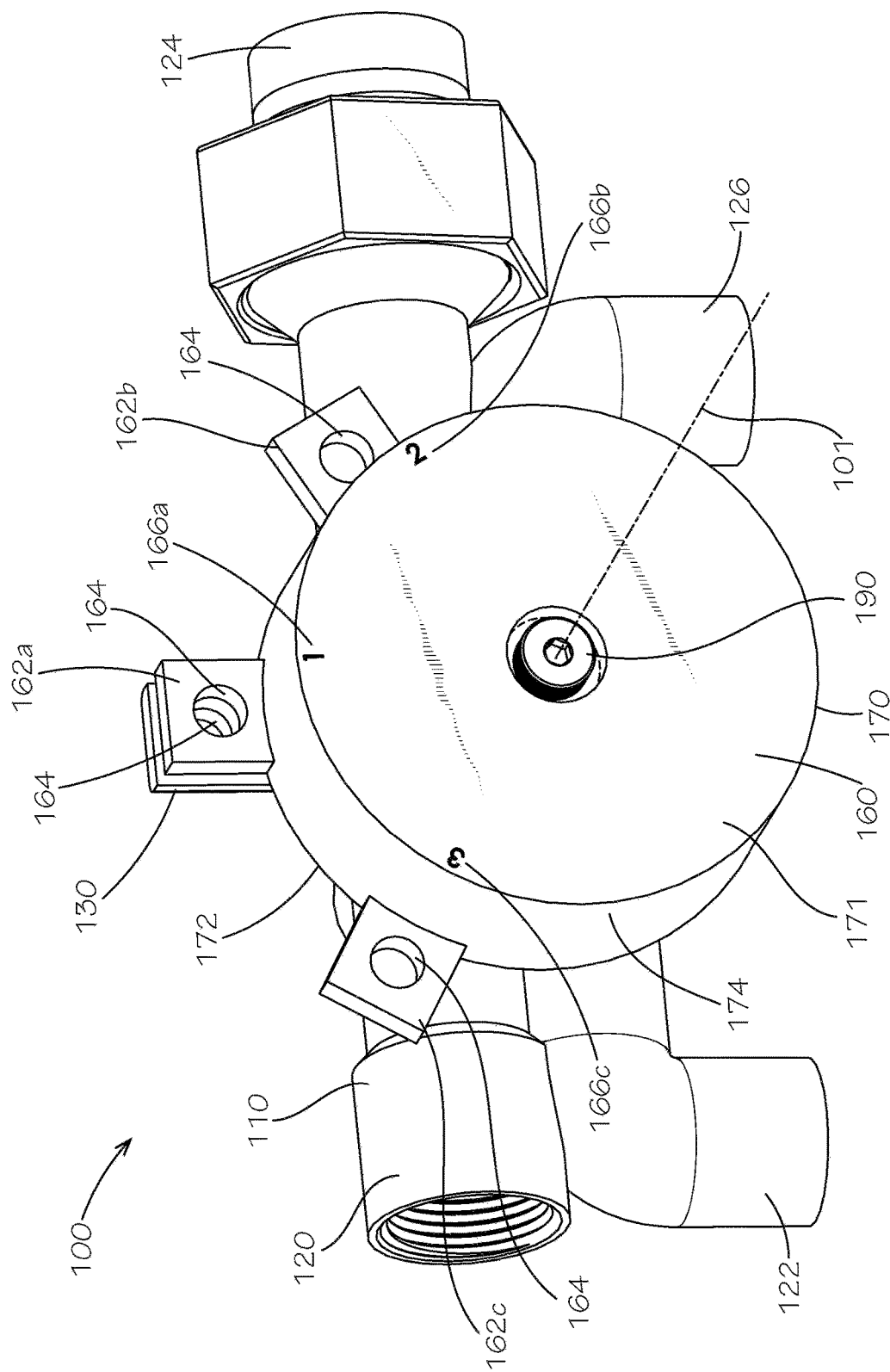
FIG. 1 is a front perspective view of a bypass valve comprising a base and a selector in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a bypass valve and associated methods, systems, devices, and various apparatus. The bypass valve can comprise a base and a selector. It would be understood by one of skill in the art that the disclosed bypass valve is described in but a few exemplary embodiments among many. No particular terminology or description should be considered limiting on the disclosure or the scope of any claims issuing therefrom.

FIG. 1 is a front perspective view of a bypass valve 100 comprising a base 110 and a selector 160. The base 110 and the selector 160 can be rotatable relative to one another about a rotational axis 101. In the present aspect, a fastener 190 can secure the selector 160 to the base 110, and the rotational axis 101 can extend lengthwise through the fastener 190 so that the selector 160 can rotate about the fastener 190. In the present aspect, the fastener 190 can be a bolt; however, in other aspects, the fastener 190 can be a different type of fastener, such as a screw, stud, rivet, or other suitable fastener. In other aspects, the fastener 190 can be defined by either the base 110 or the selector 160, such as by an integrally formed threaded protrusion for example and without limitation.

The selector 160 can define a front selector end 170 and a back selector end 172. The selector 160 can be positioned with the back selector end 172 facing the base 110. The selector 160 can define a perimeter selector surface 174 extending between the front selector end 170 and the back selector end 172. In the present aspect, the perimeter selector surface 174 can be a circumferential surface that defines a substantially cylindrical shape. The front selector end 170 can define a front selector surface 171, which, in the present aspect, can be substantially circular in shape.

The selector 160 can define a first selector locking lug 162a, a second selector locking lug 162b, and a third selector locking lug 162c. Each selector locking lug 162a,b,c can respectively define a locking aperture 164. The selector locking lugs 162a,b,c can each extend radially outward from the perimeter selector surface 174 relative to the rotational axis 101. In the present aspect, each of the selector locking lugs 162a,b,c can be positioned adjacent to the back selector end 172.

The base 110 can define a base locking lug 130. The base locking lug 130 can define a locking aperture 164, visible through the locking aperture 164 of the first selector locking lug 162a. Each of the selector locking lugs 162a,b,c corresponds to a different rotational position of the selector 160, which in turn corresponds to a different configuration for the bypass valve 100. For example, in the aspect shown, the selector 160 is in a meter position, wherein the locking apertures 164 of the first selector locking lug 162a and the base locking lug 130 can be aligned. When the selector 160 is in the meter position, the bypass valve 100 can be in a meter configuration (discussed below with respect to FIG. 8). The bypass valve 100 can be secured in the meter configuration by inserting a lock (not shown) through the locking apertures 164 of the first selector locking lug 162a and the base locking lug 130 to prevent rotation of the selector 160 relative to the base 110. Numerous types of locks can suffice in this role, such as barrel locks, combination locks, pad locks, etc.

From the meter position shown in FIG. 1, if the selector 160 is rotated counterclockwise (relative to the present viewing angle) to align the locking apertures 164 of the second selector locking lug 162b and the base locking lug 130, the selector 160 can be positioned in a bypass position, which places the bypass valve 100 in a bypass configuration (discussed below with respect to FIG. 9). As similarly noted above, the bypass valve 100 can be secured in the bypass configuration by inserting the lock through the locking apertures 164 of the second selector locking lug 162b and the base locking lug 130 to prevent rotation of the selector 160 relative to the base 110.

From the meter position shown in FIG. 1, if the selector 160 is rotated clockwise (relative to the present viewing angle) to align the locking apertures 164 of the third selector locking lug 162c and the base locking lug 130, the selector 160 can be positioned in a shutoff position, which places the bypass valve 100 in a shutoff configuration (discussed below with respect to FIG. 10). As similarly noted above, the bypass valve 100 can be secured in the shutoff configuration by inserting the lock through the locking apertures 164 of the third selector locking lug 162c and the base locking lug 130 to prevent rotation of the selector 160 relative to the base 110.

In the present aspect, the bypass position and the shutoff position can each be rotationally offset from the meter position by sixty degrees; however, in other aspects, the bypass position and the shutoff position can each be rotationally offset from the meter position by a larger or smaller rotational angle. In the present aspect, the front selector surface 171 can define position indicia 166a,b,c, which can be respectively rotationally aligned with the selector locking lugs 162a,b,c to provide information corresponding to the respective position/configuration associated with each selector locking lug 162a,b,c. In the present aspect, the position indicia 166a,b,c can respectively define the numerals "1," "2," and "3." In other aspects, the position indicia 166a,b,c can respectively define words, such as "meter," "bypass," and "shutoff," for example and without limitation.

The base 110 can either comprise or define an upstream utility connector 120, a meter inlet connector 122, a downstream utility connector 124, and a meter outlet connector 126. The manner in which a fluid may flow through the connectors 120,122,124,126 of the bypass valve 100 can depend upon which configuration the bypass valve 100 is in.

Figure 2:
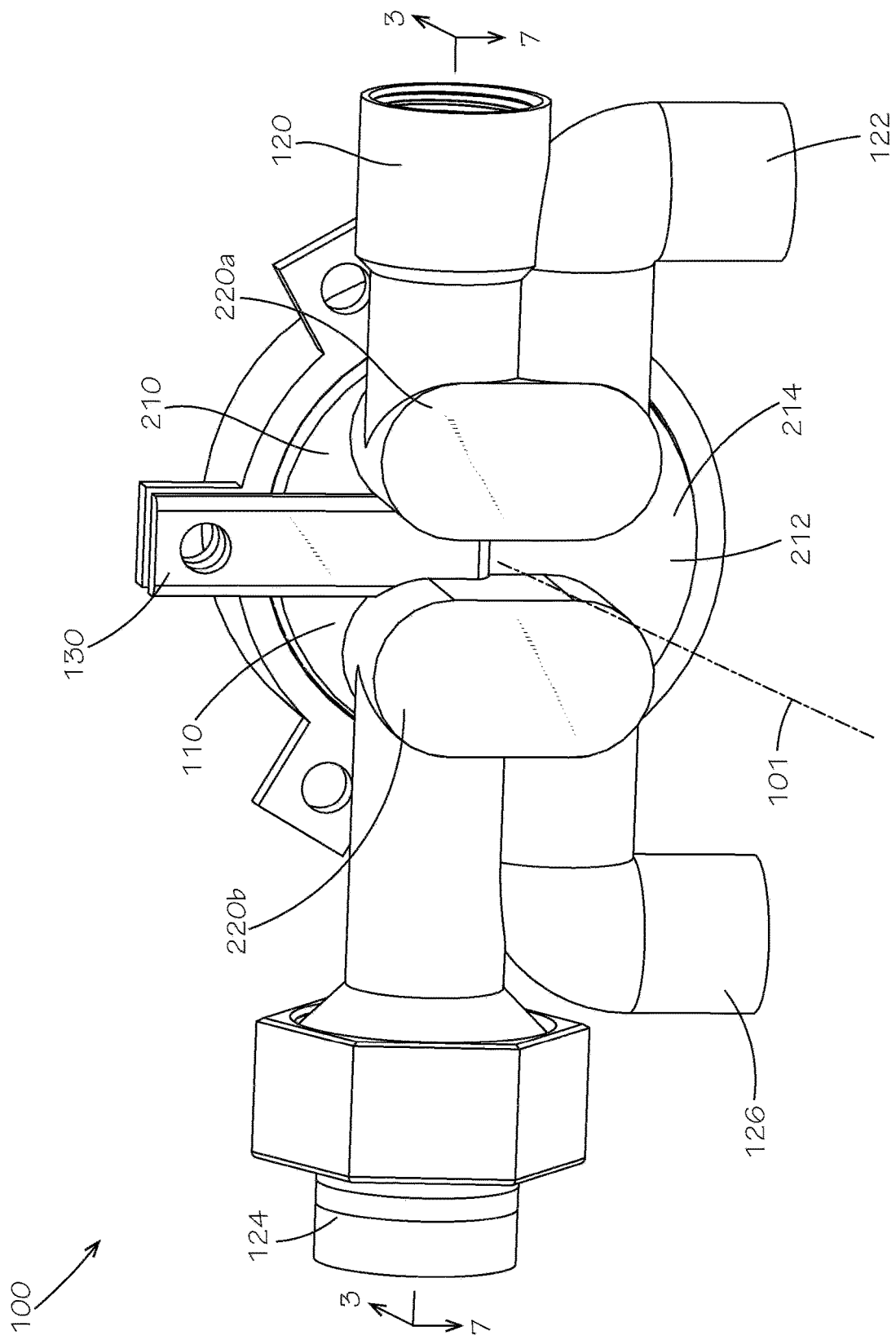
FIG. 2 is a rear perspective view of the bypass valve of FIG. 1.

FIG. 2 is a rear perspective view of the bypass valve 100 of FIG. 1. The connectors 120,122,124,126 can each extend outwards from a central body 210 of the base 110. The central body 210 can define a back central body end 212, and the back central body end 212 can define a back central body surface 214. In the present aspect, the connectors 120,122, 124,126 can be integrally formed with the back central body surface 214, with the exception of portions of the downstream utility connector 124. One or more of the connectors 120,122,124,126 can comprise one or more separate components from the central body 210, such as pipe or tubing fittings for example and without limitation, that can be coupled to the central body 210. In the aspect shown, the downstream utility connector 124 can comprise a fitting, such as a threaded fitting 344, as further discussed below with respect to FIG. 3.

In the aspect shown in FIG. 2, connectors 120,122 can be partially defined by a first boss 220a, and connectors 124, 126 can be partially defined by a second boss 220b. The bosses 220a,b can extend outward from the back central body surface 214 in an axial direction relative to the rotational axis 101.

In the present aspect, the base locking lug 130 can be integrally formed with the back central body surface 214 of the central body 210.

Figure 3:
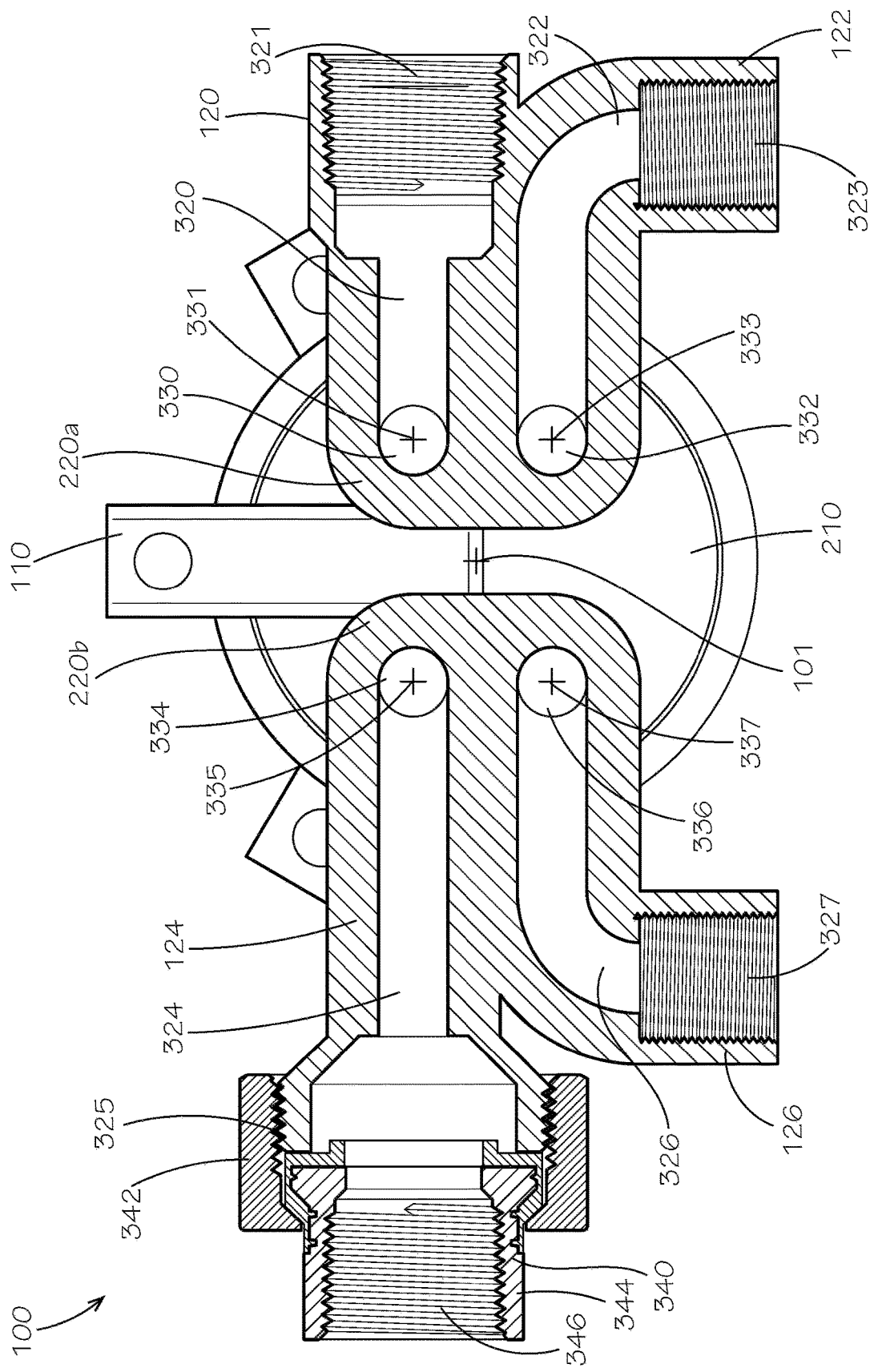
FIG. 3 is a cross-sectional view of the bypass valve of FIG. 1 taken along line 3-3 shown in FIG. 2.

FIG. 3 is a cross-sectional view of the bypass valve 100 of FIG. 1 taken along Line 3-3 shown in FIG. 2. The base 110 can define a plurality of bores 330,332,334,336 extending through the central body 210 and partially into the bosses 220a,b. An upstream utility bore 330 of the plurality of bores 330,332,334,336 can define an upstream utility bore axis 331. A meter inlet bore 332 of the plurality of bores 330,332,334,336 can define a meter inlet bore axis 333. A downstream utility bore 334 of the plurality of bores 330, 332,334,336 can define a downstream utility bore axis 335. A meter outlet bore 336 of the plurality of bores 330,332, 334,336 can define a meter outlet bore axis 337. In the present aspect, the axes 331,333,335,337 can be substantially parallel to the rotational axis 101 (axes 101,331,333, 335,337 shown extending out of the page).

The connectors 120,122,124,126 can each define a connector passage 320,322,324,326, which can each intersect a different one of the bores 330,332,334,336. The upstream utility connector 120 can define an upstream utility connector passage 320, which can intersect the upstream utility bore 330. The meter inlet connector 122 can define a meter inlet connector passage 322, which can intersect the meter inlet bore 332. The downstream utility connector 124 can define a downstream utility connector passage 324, which can intersect the downstream utility bore 334. The meter outlet connector 126 can define a meter outlet connector passage 326, which can intersect the meter outlet bore 336.

The connectors 120,122,124,126 can each define a threaded portion 321,323,325,327. In the present aspect, the threaded portions 321,323,327 can be internally threaded portions positioned within the respective connector passages 320,322,326, opposite from the respective bores 330,332, 336. The threaded portion 325 can be an externally threaded portion positioned external to the downstream utility connector passage 324. In other aspects, any of the threaded portions 321,323,325,327 may be internally or externally threaded.

As noted above, some portions of the downstream utility connector 124 may not be integrally formed with the central body 210. In the present aspect, the downstream utility connector 124 can comprise a coupling 340. The coupling 340 can comprise a threaded collar 342 coupled to a threaded fitting 344. The threaded fitting 344 can be configured to rotate relative to the threaded collar 342. In the present aspect, the threaded collar 342 can threadedly engage the threaded portion 325. The threaded fitting 344 can define an internally threaded portion 346, such that the coupling 340 can convert the downstream utility connector 124 from a male connector to a female connector. In some aspects, any or all of the connectors 120,122,124,126 can comprise the coupling 340. In some aspects, they downstream utility connector 124 may not comprise the coupling 340.

Figure 8:
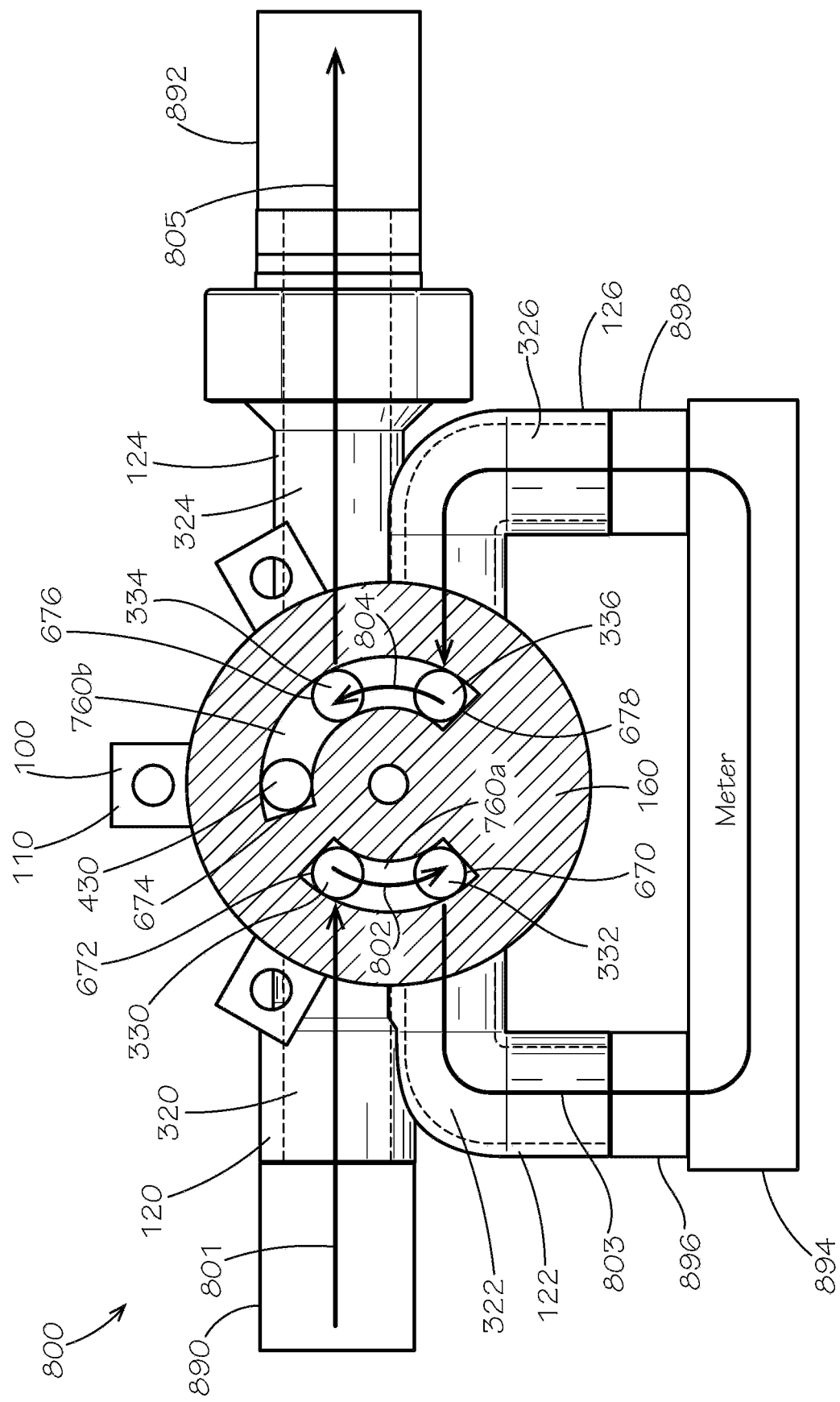
FIG. 8 is a front view of a utility metering system comprising the bypass valve of FIG. 1, shown in cross-section in a meter configuration, taken along line 8-8 shown in FIG. 7, an upstream utility line, a downstream utility line, and a meter in accordance with another aspect of the present disclosure.

The threaded portion 321 can be configured to couple the bypass valve 100 to an upstream utility line 890 (shown in FIG. 8). The threaded portion 325 can be configured to indirectly couple the bypass valve 100 to a downstream utility line 892 (shown in FIG. 8) via the coupling 340, which can directly couple to the downstream utility line 892. The threaded portions 323,327 can be configured to respectively couple the bypass valve 100 to an inlet 896 (shown in FIG. 8) of a meter 894 (shown in FIG. 8) and an outlet 898 (shown in FIG. 8) of the meter 894.

Figure 4:
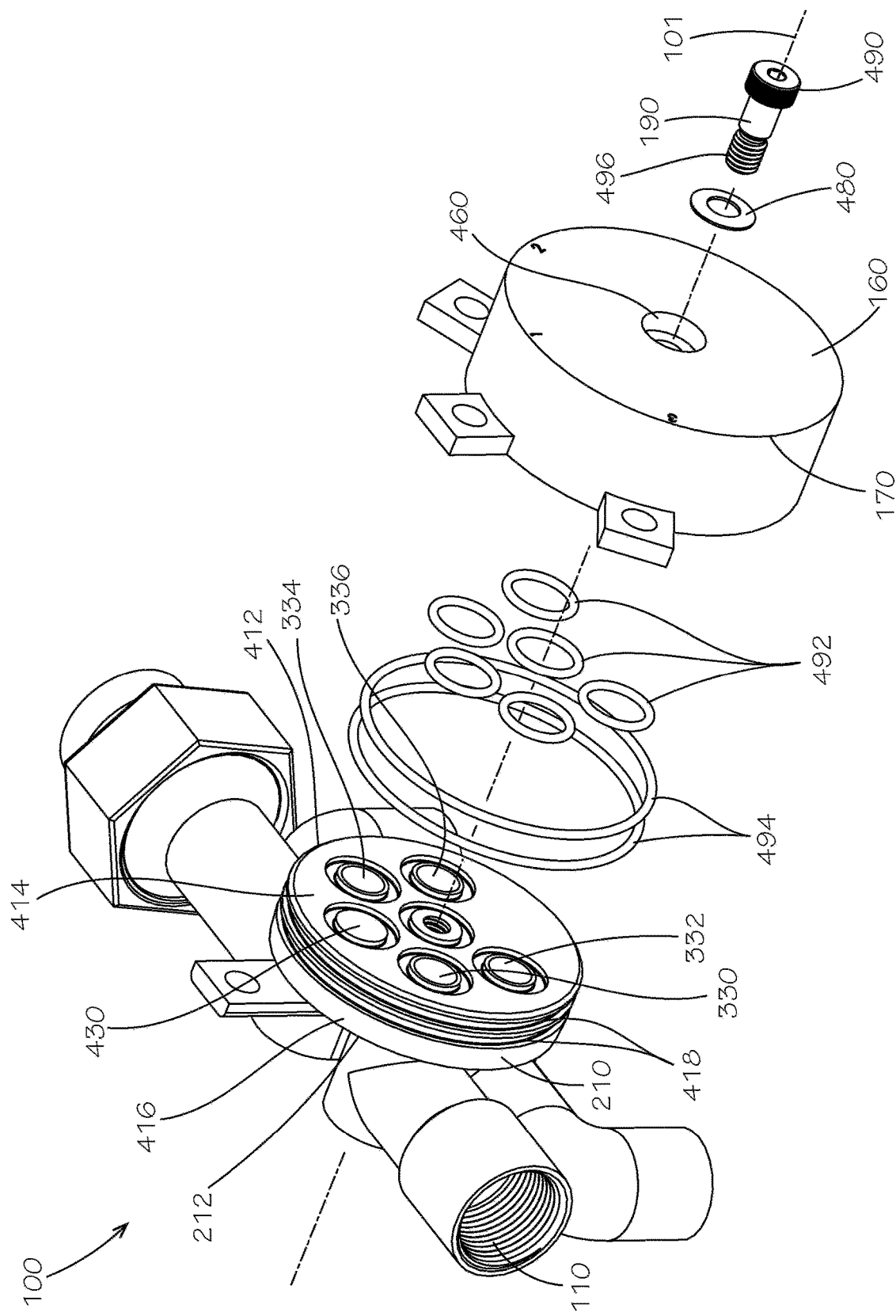
FIG. 4 is an exploded front perspective view of the bypass valve of FIG. 1.

FIG. 4 is an exploded front perspective view of the bypass valve 100 of FIG. 1. The bypass valve 100 is exploded along the rotational axis 101. The bypass valve 100 can be disassembled by removing the fastener 190 and separating the selector 160 from the base 110. As shown, the front selector end 170 can define a countersunk recess 460, which can receive a washer 480 and a fastener cap 490 of the fastener 190. Further, as shown, the fastener 190 can comprise a threaded end 496.

The central body 210 of the base 110 can define a front central body end 412 opposite from the back central body end 212. The front central body end 412 can define a base sealing surface 414 of the base 110. The central body 210 can define a perimeter central body surface 416 extending between the front central body end 412 and the back central body end 212. In the present aspect, the central body 210 can define a substantially cylindrical shape, and the perimeter central body surface 416 can be a circumferential surface that is substantially cylindrical. In the present aspect, the perimeter central body surface 416 can define at least one outer seal groove 418, which can receive at least one outer seal 494. In the present aspect, the perimeter central body surface 416 can define a pair of outer seal grooves 418, and the bypass valve 100 can comprise a pair of outer seals 494. In the present aspect, the outer seals 494 can be O-rings; however, in other aspects, the outer seals 494 can be a different type of seal.

Additionally, the bypass valve 100 can comprise at least one selector seal 492. A different one of the selector seals 492 can be positioned around each of the bores 330,332, 334,336, as well as a blind face 430 defined by the base sealing surface 414. In the present aspect, the bypass valve 100 can comprise six selector seals 492. In the present aspect, the selector seals 492 can be O-rings. The selector seals 492 can fit into a plurality of grooves, as described below with respect to FIG. 5.

Figure 5:
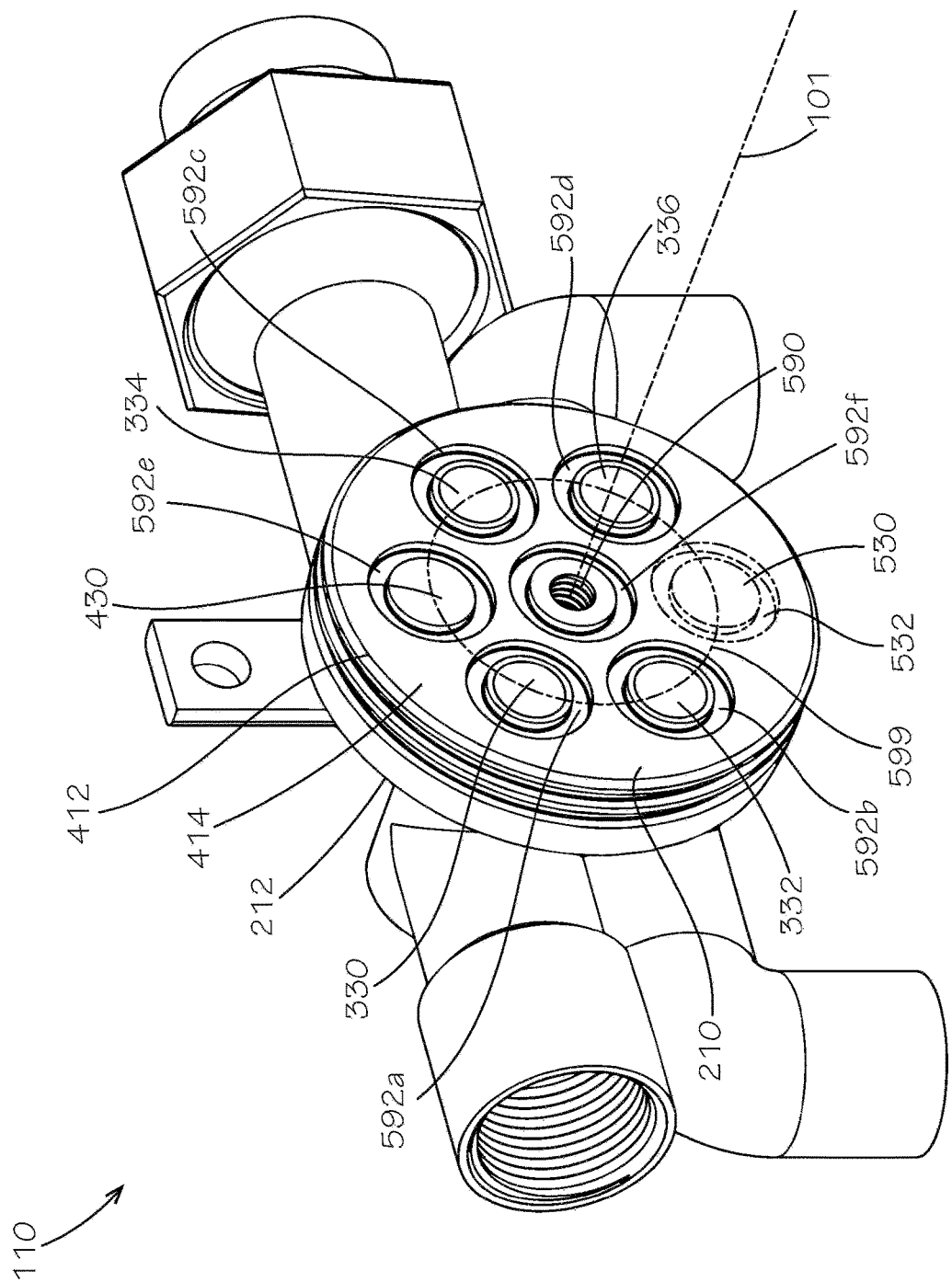
FIG. 5 is a front perspective view of the base of the bypass valve of FIG. 1.

FIG. 5 is a front perspective view of the base 110 of the bypass valve 100 of FIG. 1. The base sealing surface 414 can define a plurality of grooves 592a,b,c,d,e,f, at the front central body end 412 of the central body 210. The grooves 592a,b,c,d can respectively encircle bores 330,332,334,336. The groove 592e can encircle the blind face 430. The groove 592f can encircle a fastener hole 590. Each of the grooves 592a,b,c,d,e,f, can be configured to receive a different one of the selector seals 492 (shown in FIG. 4), such that the selector seals 492 can form seals with the base sealing surface 414. The base sealing surface 414 can be planar with the exception of the grooves 592a,b,c,d,e,f and the fastener hole 590.

The fastener hole 590 can be configured to receive the fastener 190 (shown in FIG. 1) to secure the selector 160 (shown in FIG. 1) to the base 110. In the present aspect, the fastener hole 590 can be internally threaded and configured to engage the threaded end 496 of the fastener 190. In contrast to the bores 330,332,334,336, which can extend completely through the central body 210 from the front central body end 412 to the back central body end 212, in the present aspect, the fastener hole 590 can be a blind hole that extends into the central body 210 from the front central body end 412 but does not extend through the back central body end 212. In other aspects, the fastener hole 590 can extend completely through the central body 210.

In the present aspect, the bores 330,332,334,336 and the blind face 430 can be spaced around a circular pattern 599, which can be centered about the rotational axis 101. Each of the bores 330,332,334,336 and the blind face 430 can be spaced from the nearest adjacent bore/blindface by about a sixty-degree arc along the circular pattern 599. The bores 332,336 can be spaced apart by about a 120-degree arc along the circular pattern 599. In some aspects, a second blind face 530 (shown in broken lines) can be positioned along the circular pattern, equally spaced between the bores 332,336, and the second blind face 530 can be encircled by a groove 532 (shown in broken lines), similar to the grooves 592a, b,c,d,e,f. In such aspects, the bypass valve 100 (shown in FIG. 1) can comprise seven selector seals 492 (shown in FIG. 4), and the groove 532 can receive one of the selector seals 492.

Figure 6:
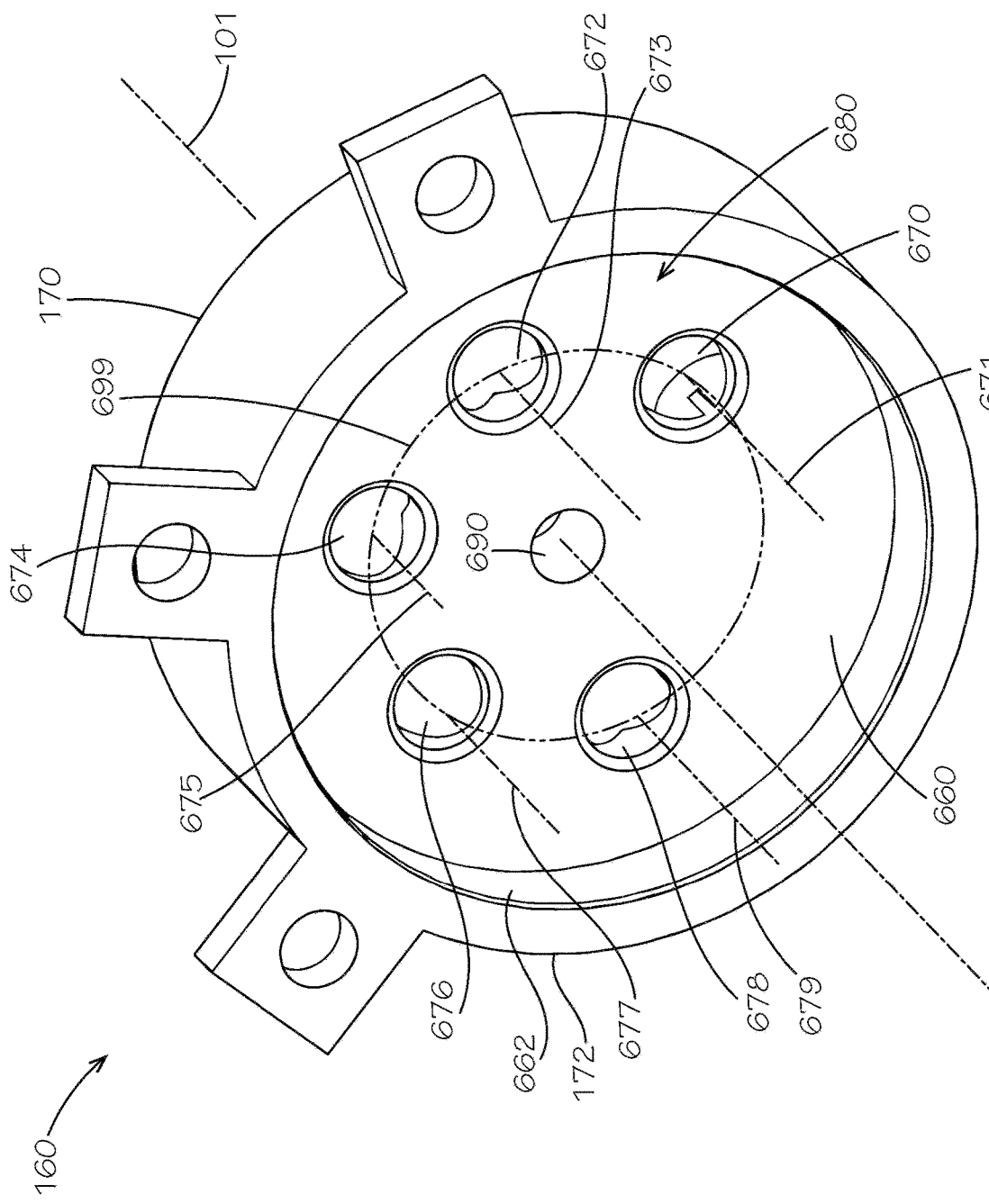
FIG. 6 is a rear perspective view of the selector of the bypass valve of FIG. 1.

FIG. 6 is a rear perspective view of the selector 160 of the bypass valve 100 of FIG. 1. In the present aspect, the selector 160 can define a selector recess 680 extending into the back selector end 172 towards the front selector end 170 to a selector sealing surface 660. The selector sealing surface 660 can be substantially perpendicular to the rotational axis 101. The selector sealing surface 660 can be planar. An inner sealing surface 662 can be defined extending between the back selector end 172 and the selector sealing surface 660. In the present aspect, the inner sealing surface 662 can define a cylindrical shape.

The selector 160 can define a fastener hole 690 extending through the selector 160 from the selector sealing surface 660 to the front selector end 170. The fastener hole 690 can be coaxial with the rotational axis 101. The fastener hole 690 can be configured to receive the fastener 190 (shown in FIG. 1), which can extend through the fastener hole 690 to engage the internal threading of the fastener hole 590. The selector 160 can thereby be captured and rotatable between the fastener cap 490 and the base 110 by engagement of the threaded end 496 with the internal threading of the fastener hole 590.

The selector can additionally define a plurality of bores 670,672,674,676,678 extending into the selector 160 from the selector sealing surface 660 towards the front selector end 170. The bores 670,672,674,676,678 can respectively define axes 671,673,675,677,679, which can each be parallel to the rotational axis 101 in the present aspect. In other aspects, one or more of the axes 671,673,675,677,679 may not be parallel to the rotational axis 101.

The bores 670,672,674,676,678 can be distributed about a circular pattern 699, which can be centered about the rotational axis 101, such that each axis 671,673,675,677,679 can intersect the circular pattern 699. The circular pattern 699 can be of the same size as the circular pattern 599 (shown in FIG. 5). Each bore 670,672,674,676,678 can be spaced apart from the nearest adjacent bore by about a sixty-degree arc along the circular pattern 699. The bores 670,678 can be spaced apart by about a 120-degree arc along the circular pattern 699.

Figure 7:
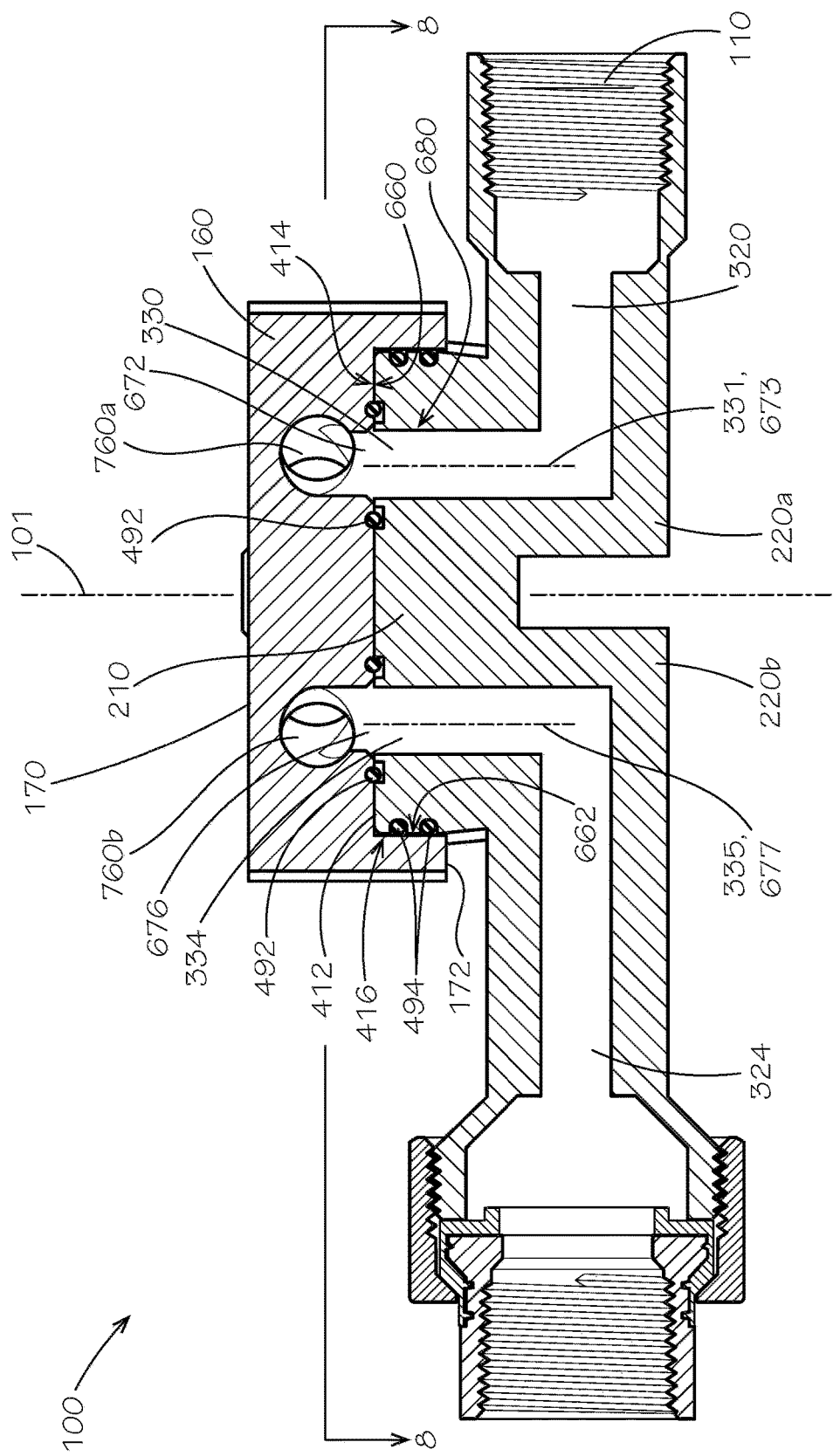
FIG. 7 is a cross-sectional view of the bypass valve of FIG. 1 taken along line 7-7 shown in FIG. 2.

FIG. 7 is a cross-sectional view of the bypass valve 100 of FIG. 1 taken alone Line 7-7, shown in FIG. 2. The selector 160 can fit over the central body 210 of the base 110 so that the front central body end 412 can be received within the selector recess 680. The outer seals 494 can be axially positioned between the back selector end 172 and the selector sealing surface 660 relative to the rotational axis 101. The outer seals 494 can be radially positioned between the perimeter central body surface 416 and the inner sealing surface 662 relative to the rotational axis 101. The outer seals 494 can form seals between the perimeter central body surface 416 and the inner sealing surface 662. The outer seals 494 can prevent foreign matter, such as dust or dirt, from entering the selector recess 680. The outer seals 494 can also provide redundant containment should one of the selector seals 492 fail.

In the aspect shown, the bypass valve 100 can be in the meter configuration, and the selector 160 can be in the meter position. In the meter position, the bore 672 of the selector 160 can be aligned with the upstream utility bore 330, and the respective axes 331,673 of the bores 330,672 can be coaxial with one another. In the meter position, the bore 676 of the selector 160 can be aligned with the downstream utility bore 334, and the respective axes 335,677 of the bores 334,676 can be coaxial with one another.

The selector sealing surface 660 can be positioned parallel to the base sealing surface 414, and the selector sealing surface 660 can be positioned in sealing engagement with the base sealing surface 414. Specifically, the selector seals 492 can form seals between the selector sealing surface 660 and the base sealing surface 414 so that the bore 672 can be connected and sealed in fluid communication with the upstream utility bore 330, and the bore 676 can be connected and sealed in fluid communication with the downstream utility bore 334 in the meter position. As discussed below with respect to FIGS. 8-10, in each of the meter position, the bypass position, and the shutoff position, the bores 670,672, 674,676,678 (bores 670,674,678 shown in FIG. 6) can align and seal with different combinations of the bores 330,332, 334,336 (bores 332,336 shown in FIG. 3) and the blind face 430 (shown in FIG. 4) in the same way shown and described with respect to bores 330,672 and 334,676 in FIG. 7.

Returning to FIG. 7, the bore 672 can be connected in fluid communication with a primary passage 760a, and the bore 676 can be connected in fluid communication with a secondary passage 760b. The passages 760a,b can be defined within the selector 160 between the selector sealing surface 660 and the front selector end 170. The passages 760a,b, can be isolated from one another so that the passages 760a,b are not directly connected in fluid communication with one another within the selector 160.

As referenced above, the bores 330,332,334,336 (bores 332,336 shown in FIG. 3) can extend through the central body 210 and into the bosses 220a,b, where the respective connector passages 320,322,324,326 (connector passages 322,326 shown in FIG. 3) can intersect the bores 330,332, 334,336. In the aspect shown, the connector passages 320, 322,324,326 can directly intersect the bores 330,332,334, 336 such that the connector passages 320,322,324,326 can be substantially perpendicular to the bores 330,332,334,336. In other aspects, the connector passages 320,322,324,326 can transition into the bores 330,332,334,336, such as with a curved elbow portion (not shown) defining a radius of curvature (not shown).

FIG. 8 is a front view of a utility metering system 800 comprising the bypass valve 100 of FIG. 1, shown in cross-section taken along Line 8-8 of FIG. 7, the upstream utility line 890, the downstream utility line 892, and the meter 894. The upstream utility line 890 can be connected in fluid communication with the upstream utility connector 120. The downstream utility line 892 can be connected in fluid communication with the downstream utility connector 124. The inlet 896 of the meter 894 can be connected in fluid communication with the meter inlet connector 122. The outlet 898 of the meter 894 can be connected in fluid communication with the meter outlet connector 126.

In the aspect shown, the bypass valve 100 is in the meter configuration, and the selector 160 is in the meter position. In the meter position, the upstream utility bore 330 can align and seal in fluid communication with the bore 672 of the primary passage 760a. The meter inlet bore 332 can align and seal in fluid communication with the bore 670 of the primary passage 760a. The downstream utility bore 334 can align and seal in fluid communication with the bore 676 of the secondary passage 760*b*. The meter outlet bore 336 can align and seal in fluid communication with the bore 678 of the secondary passage 760*b*. The blind face 430 can align, seal, and block the bore 674 of the secondary passage 760*b*.

The flow arrows 801,802,803,804,805 can represent flow of a fluid through the utility metering system 800 in the meter configuration. As shown by the flow arrow 801, the fluid can flow from the upstream utility line 890 and through the upstream utility connector passage 320 (shown in transparency) of the upstream utility connector 120 to the upstream utility bore 330. From the upstream utility bore 330, the fluid can flow into the primary passage 760*a* through the bore 672, where the fluid can then flow towards the bore 670 of the primary passage 760*a*, as shown by the flow arrow 802. The fluid can then flow through the bore 670 to the meter inlet bore 332, where the fluid can flow through the meter inlet connector passage 322 (shown in transparency) of the meter inlet connector 122, through the inlet 896 of the meter 894, out of the meter 894 through the outlet 898, through the meter outlet connector passage 326 (shown in transparency) of the meter outlet connector 126 to the meter outlet bore 336, as shown by the flow arrow 803. As shown by the flow arrow 804, the fluid can flow from the meter outlet bore 336 into the secondary passage 760*b* through the bore 678, where the fluid can then flow to the bore 676 and into the downstream utility bore 334. As shown by the flow arrow 805, the fluid can then flow from the downstream utility bore 334 and through the downstream utility connector passage 324 (shown in transparency) of the downstream utility connector 124 to the downstream utility line 892.

In short, in the meter configuration, the bypass valve 100 routes the fluid from the upstream utility line 890, through the meter 894, and out to the downstream utility line 892. As the fluid flows through the meter 894, the meter 894 can measure and store data about one or more parameters of the fluid and/or its flow. For example and without limitation, the meter 894 can measure and record a flowrate of the fluid through the meter 894 so that an aggregate volume or mass of fluid passing through the meter 894 over a period of time can be measured.

Figure 9:
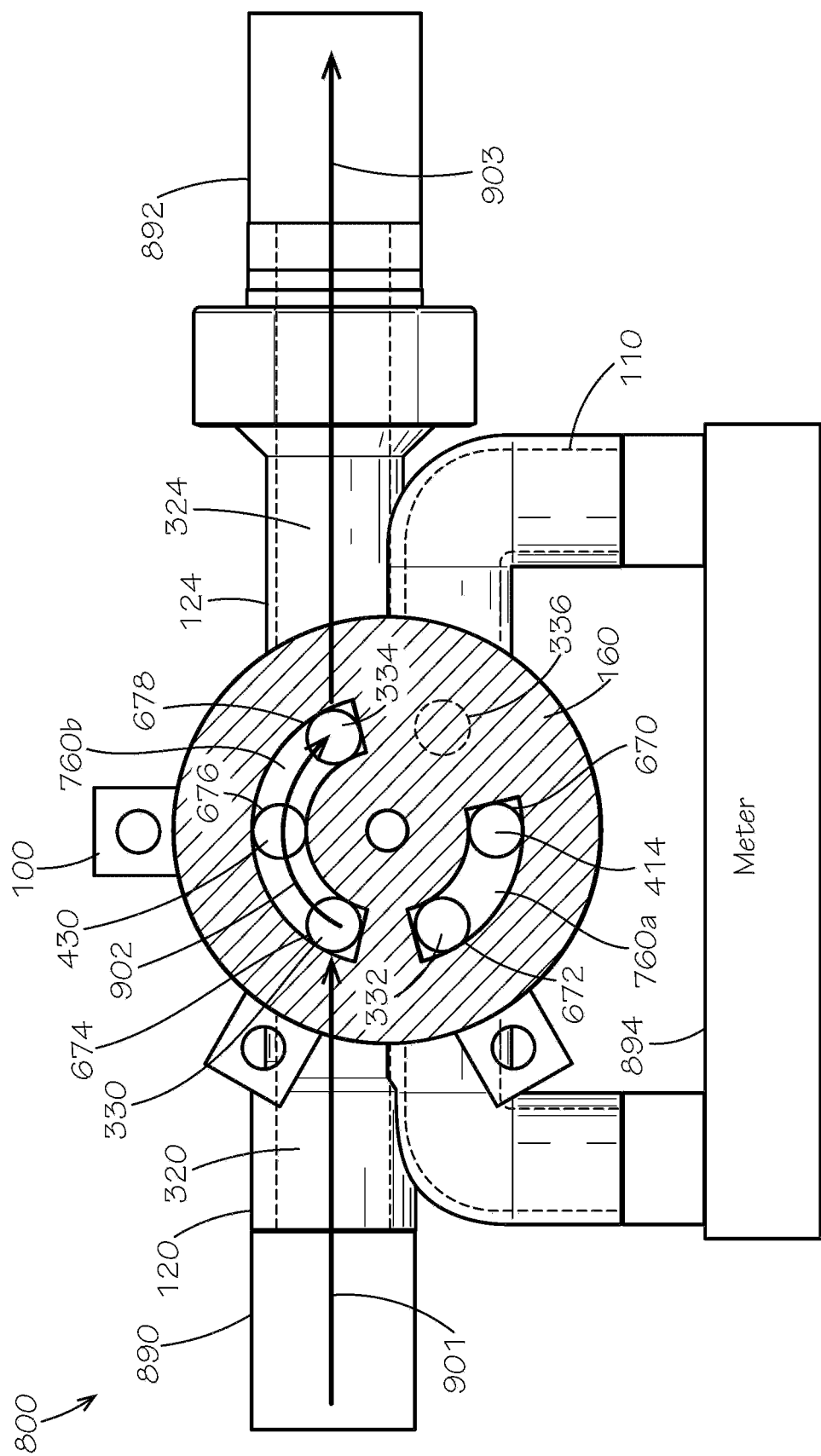
FIG. 9 is a front view of the utility metering system of FIG. 8 with the bypass valve shown in cross-section in a bypass configuration, taken along line 8-8 shown in FIG. 7.

FIG. 9 is a front view of the utility metering system 800 of FIG. 8 with the bypass valve 100 of FIG. 1 shown in cross-section taken along Line 8-8 of FIG. 7. In the aspect shown, the bypass valve 100 is in the bypass configuration, and the selector 160 is in the bypass position.

In the bypass configuration, the upstream utility bore 330 can align and seal in fluid communication with the bore 674 of the secondary passage 760*b*. The blind face 430 can align, seal, and block the bore 676 of the secondary passage 760*b*. The downstream utility bore 334 can align and seal in fluid communication with the bore 678 of the secondary passage 760*b*. The meter inlet bore 332 can align and seal in fluid communication with the bore 672 of the primary passage 760*a*. The bore 670 of the primary passage 760*a* can be blocked by the base sealing surface 414. In aspects defining a second blind face 530 (shown in FIG. 5), the second blind face 530 can align, block, and seal the bore 670. The selector sealing surface 660 (shown in FIG. 6) can seal with and block the meter outlet bore 336 (shown in transparency).

The flow arrows 901,902,903 can represent flow of a fluid through the utility metering system 800 in the bypass configuration. As shown by arrow 901, the fluid can flow from the upstream utility line 890 and through the upstream utility connector passage 320 (shown in transparency) of the upstream utility connector 120 to the upstream utility bore 330. From the upstream utility bore 330, the fluid can flow into the secondary passage 760*b* through the bore 674, where the fluid can flow past bore 676, which can be blocked and sealed by the blind face 430, towards the bore 678 of the secondary passage 760*b*, as shown by the flow arrow 902. The fluid can then flow through the bore 678 to the downstream utility bore 334, where the fluid can flow through the downstream utility connector passage 324 (shown in transparency) of the downstream utility connector 124 to the downstream utility line 892, as shown by the flow arrow 902. In the bypass configuration, the fluid can bypass the meter 894, and no fluid passes through the primary passage 760*a* or the meter 894.

Figure 10:
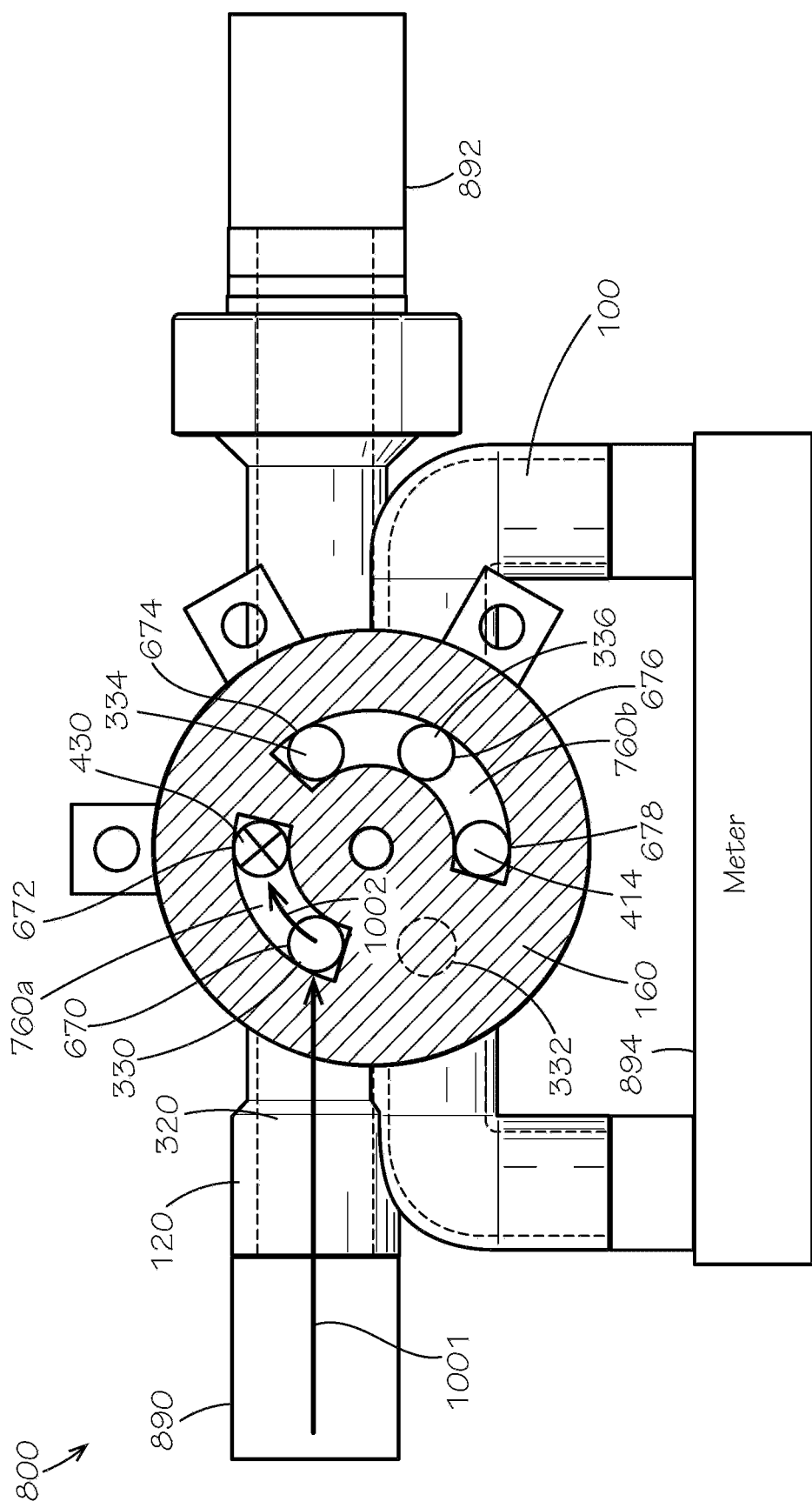
FIG. 10 is a front view of the utility metering system of FIG. 8 with the bypass valve shown in cross-section in a shutoff configuration, taken along line 8-8 shown in FIG. 7.

FIG. 10 is a front view of the utility metering system 800 of FIG. 8 with the bypass valve 100 of FIG. 1 shown in cross-section taken along Line 8-8 of FIG. 7. In the aspect shown, the bypass valve 100 is in the shutoff configuration, and the selector 160 is in the shutoff position.

In the shutoff configuration, the upstream utility bore 330 can align and seal in fluid communication with the bore 670 of the primary passage 760*a*. The blind face 430 can align, seal, and block the bore 672 of the primary passage 760*a*. The downstream utility bore 334 can align and seal in fluid communication with the bore 674 of the secondary passage 760*b*. The selector sealing surface 660 (shown in FIG. 6) can seal with and block the meter inlet bore 332 (shown in transparency). The meter outlet bore 336 can align and seal in fluid communication with the bore 676 of the secondary passage 760*b*. The bore 678 of the secondary passage 760*b* can be blocked by the base sealing surface 414. In aspects defining the second blind face 530 (shown in FIG. 5), the second blind face 530 can align, block, and seal the bore 678.

In the shutoff configuration, no fluid flows through the bypass valve 100. Rather than denote flow, the arrows 1001,1002 can demonstrate the path of fluid communication from the upstream utility line 890 and how the bypass valve 100 blocks fluid flow. As shown by arrow 1001, the upstream utility line 890 can be connected in fluid communication with the upstream utility bore 330 through the upstream utility connector passage 320 of the upstream utility connector 120. The upstream utility bore 330 can be connected in fluid communication with the bore 670 of the primary passage 760*a*, which in turn can connect the primary passage 760*a* in fluid communication from the bore 670 to the bore 672, as shown by arrow 1002. However, as denoted by the "X" over the blind face 430, the blind face 430 aligns, seals, and blocks the bore 672, thereby preventing any fluid flow through the bypass valve 100 in the shutoff configuration. Additionally, in the shutoff configuration, no fluid flows through the meter 894 or the secondary passage 760*b*.

Figure 11:
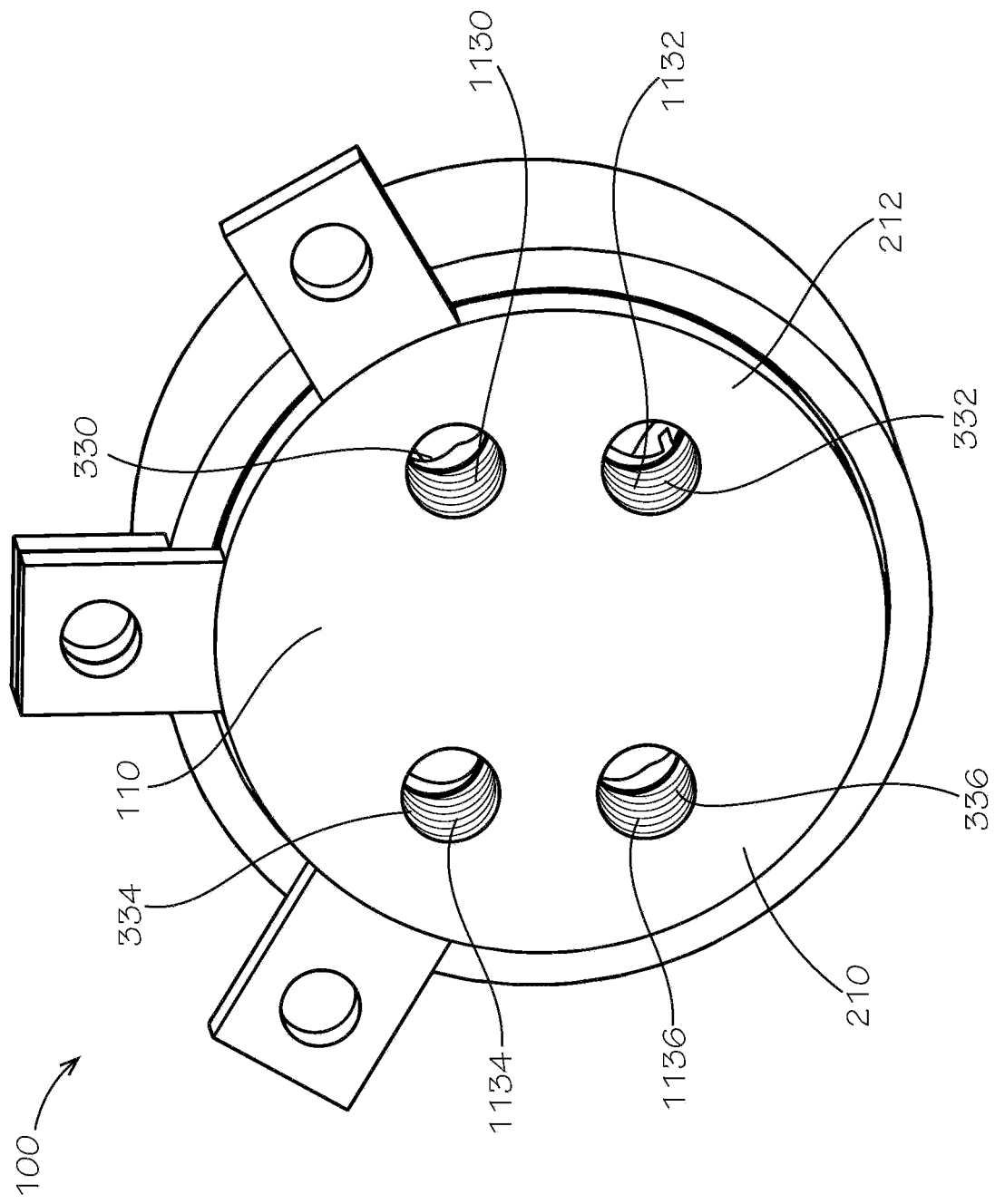
FIG. 11 is a rear perspective view of another aspect of the bypass valve in accordance with another aspect of the present disclosure.

FIG. 11 is a rear perspective view of another aspect of the bypass valve 100 in accordance with another aspect of the present disclosure. The aspect shown can be substantially similar to the bypass valve 100 of FIG. 1; however, the base 110 of the present aspect may not comprise the integrally formed connectors 120,122,124,126 (shown in FIG. 1). In the present aspect, the bores 330,332,334,336 can respectively define an internally threaded portion 1130,1132,1134, 1136 extending into the respective bores 330,332,334,336 from the back central body end 212 of the central body 210. In other aspects, one or more of the bores 330,332,334,336 can define an externally threaded nipple (not shown) extending outwards from the back central body end 212. In aspects wherein the bores 330,332,334,336 define internal or external threading, separate components, such as pipe or tube fittings, hoses, or other components can be threadedly engaged with the bores 330,332,334,336 to define the connectors of the base 110.

Figure 12:
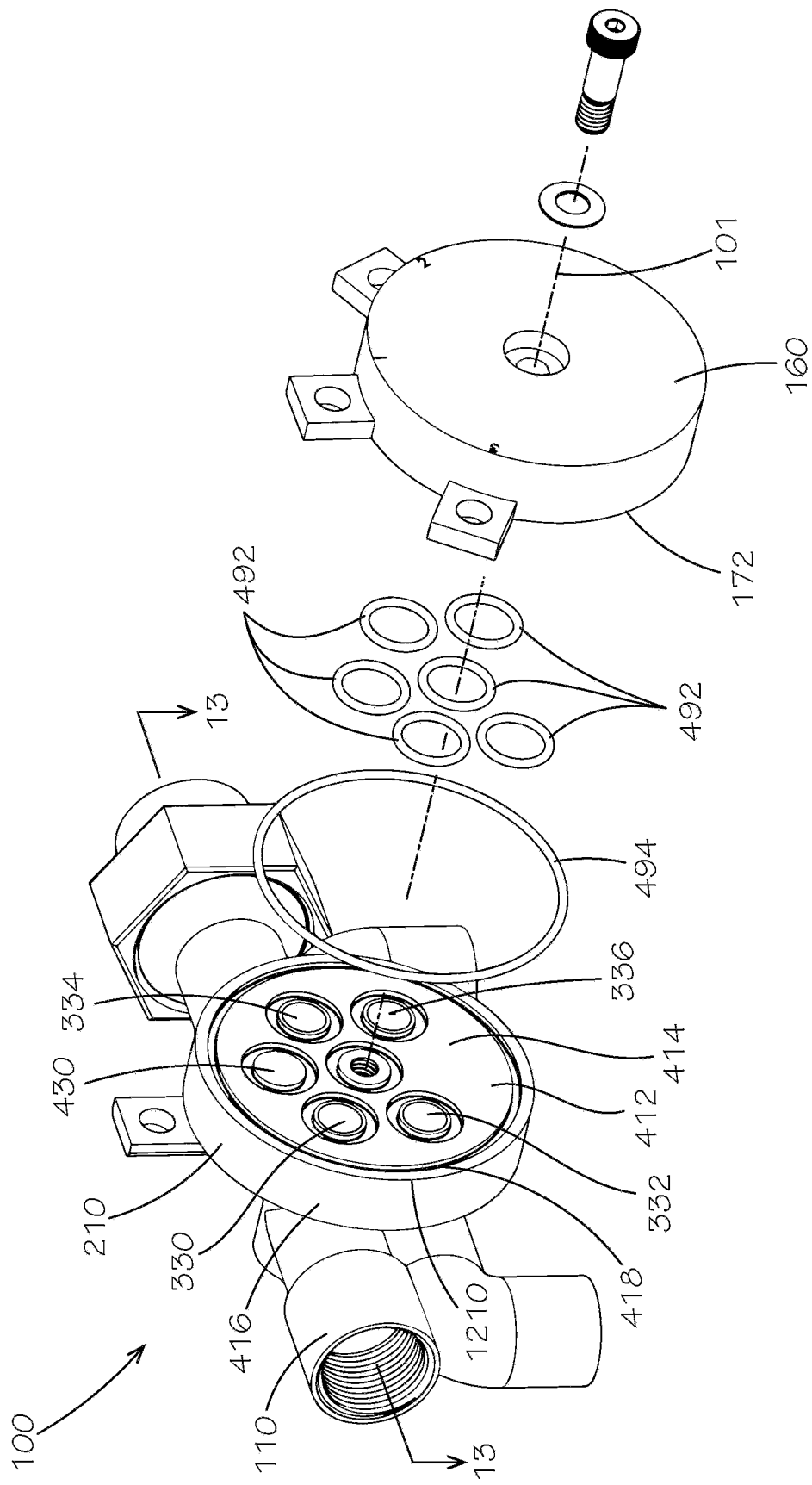
FIG. 12 is an exploded front perspective view of another aspect of the bypass valve in accordance with another aspect of the present disclosure.

FIG. 12 is an exploded front perspective view of another aspect of the bypass valve 100 in accordance with another aspect of the present disclosure. The bypass valve 100 of the present aspect can function similarly to the bypass valve 100 of FIG. 1; however, in the aspect shown, the outer seal groove 418 can be defined by the base sealing surface 414 at the front central body end 412 of the central body 210 of the base 110, instead of being defined by the perimeter central body surface 416 as shown in FIG. 4. In the present aspect, the outer seal groove 418 can be spaced radially inward from an outer edge 1210 of the base sealing surface 414 with respect to the rotational axis 101. In other aspects, the outer seal groove 418 can be positioned adjacent to the outer edge 1210. The outer seal groove 418 can be centered about the rotational axis 101. In some aspects, the front central body end 412 can define multiple concentric outer seal grooves 418.

When the bypass valve 100 is assembled, the outer seal 494 can be axially positioned between the front central body end 412 of the central body 210 and the back selector end 172 of the selector 160, with respect to the rotational axis 101. The outer seal 494 can encircle each of the bores 330,332,334,336, the blind face 430, and the selector seals 492.

Figure 13:
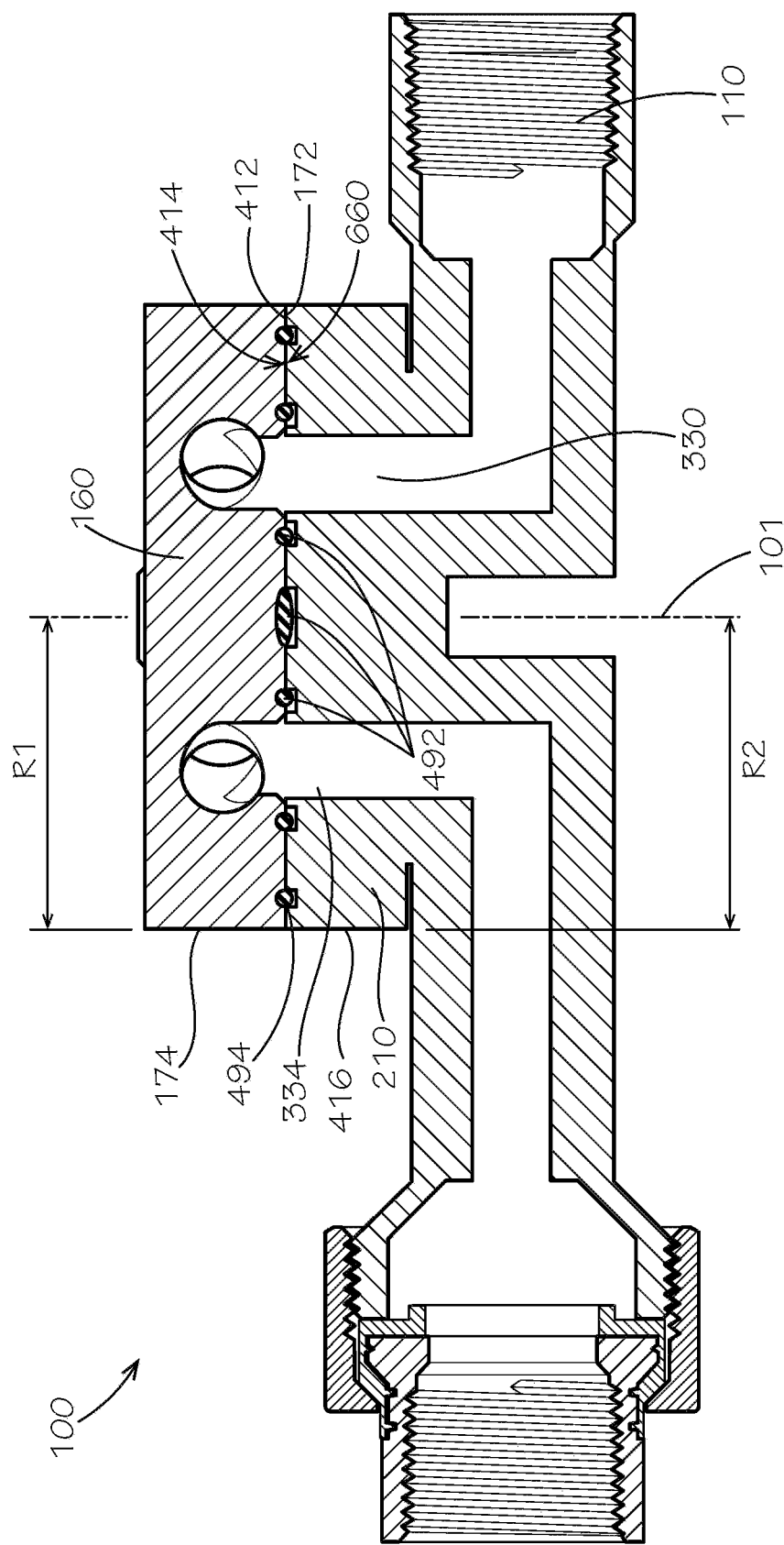
FIG. 13 is a cross-sectional view of the bypass valve of FIG. 12 taken along line 13-13 shown in FIG. 12.

FIG. 13 is a cross-sectional view of the bypass valve 100 of FIG. 12 taken along Line 13-13 shown in FIG. 12. As noted above, the outer seal 494 can be axially positioned between the front central body end 412 of the central body 210 and the back selector end 172 of the selector 160, with respect to the rotational axis 101. In the present aspect, the selector sealing surface 660 can be defined by the back selector end 172. Rather than receiving the front central body end 412 in the selector recess 680 (shown in FIG. 6), here, the back selector end 172 can be positioned in sealing engagement with the front central body end 412. Specifically, the base sealing surface 414 can be positioned in facing engagement with the selector sealing surface 660, and the outer seal 494 can form a seal between the base sealing surface 414 and the selector sealing surface 660. As noted above, the outer seal 494 can encircle the selector seals 492 and the bores 330,332,334,336 (bores 332,336 shown in FIG. 3) as demonstrated by bores 330,334.

A selector radius R1 can be defined between the rotational axis 101 and the perimeter selector surface 174. A central portion radius R2 can be defined between the rotational axis 101 and the perimeter central body surface 416. In the present aspect, the selector radius R1 and the central portion radius R2 can be equal in size compared to the aspect of FIG. 1, wherein the selector radius R1 can be greater than the central portion radius R2.

In use, the bypass valve 100 can facilitate service of meters 894 by allowing a utility company to service or replace the meter 894 without substantially disrupting flow of the fluid to a point off consumption connected to the downstream utility line 892. For example and without limitation, the upstream utility line 890 can be a branch line off a utility main, and the downstream utility line 892 can connect to a home, place of business, or other establishment.

In normal operation, the bypass valve 100 can operate in the meter configuration, wherein fluid can flow through the meter 894, and the meter 894 can track consumption of the fluid by the respective utility customer. If, for example, the meter 894 needs to be replaced or taken out of service for repair, the bypass valve 100 can be switched to the bypass configuration, which allows the fluid to continue to flow to the point of consumption/customer with only a momentary disruption in flow as the selector 160 is rotated. The meter 894 can then be serviced/replaced as needed, and once the meter 894 is operational again, the bypass valve 100 can be switched back to the meter configuration to resume monitoring the consumption of the fluid. If utility service to the point of consumption/customer needs to be discontinued, such as because of unpaid bills or the customer abandoning the premises, the bypass valve 100 can be placed in the shutoff configuration to stop the flow of fluid to the point of consumption/customer.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A bypass valve comprising:
   a base defining a base sealing surface, the base defining an upstream utility bore, a downstream utility bore, a meter inlet bore, and a meter outlet bore each extending into the base sealing surface; and
   a selector defining a primary passage and a secondary passage, the selector being rotatable relative to the base between a meter position and a bypass position, the upstream utility bore connected in fluid communication through the selector to the meter inlet bore in the meter position, the upstream utility bore connected in fluid communication through the selector to the downstream utility bore in the bypass position.

2. The bypass valve of claim 1, wherein the selector rotates about a fastener that defines a rotational axis, and the upstream utility bore defines a parallel axis relative to the rotational axis.

3. The bypass valve of claim 1, wherein:
the selector is rotatable relative to the base about a rotational axis;
a central portion of the base defines a base radius extending from the rotational axis; and
the base radius is an equal length to a radius of the selector.

4. The bypass valve of claim 1, wherein:
the selector defines a front selector end and a back selector end;
the base sealing surface is defined by a central body of the base and is positioned in sealing engagement with a selector sealing surface within a selector recess;
the central body is at least partially received by the selector recess;
an outer seal extends circumferentially around the central body; and
the outer seal forms a seal with the selector between the selector sealing surface and the back selector end.

5. The bypass valve of claim 1, wherein the selector comprises a first locking lug indicating the meter position and defining a first locking aperture, a second locking lug indicating the bypass position and defining a second locking aperture, and a third locking lug indicating a shutoff position and defining a third locking aperture.

6. The bypass valve of claim 5, wherein the bypass valve defines a rotational axis, and wherein the first locking lug, the second locking lug, and the third locking lug each extend radially outward from a perimeter selector surface relative to the rotational axis.

7. The bypass valve of claim 5, wherein:
the selector defines a front selector end and a back selector end;
a selector sealing surface is positioned between the front selector end and the back selector end; and
the first locking lug, the second locking lug, and the third locking lug are positioned adjacent to the back selector end.

8. A bypass valve comprising:
a base defining:
an upstream utility bore;
a downstream utility bore;
a meter inlet bore; and
a meter outlet bore; and
a selector rotatable relative to the base between a meter position and a bypass position,
wherein:
in the meter position, the selector connects the upstream utility bore to the meter inlet bore; and
in the bypass position, the selector connects the upstream utility bore to the downstream utility bore.

9. The bypass valve of claim 8, wherein:
the selector defines a selector sealing surface within a selector recess;
the base defines a base sealing surface defined by a central body of the base;
the base sealing surface is positioned in sealing engagement with the selector sealing surface; and
the central body is at least partially received by the selector recess.

10. The bypass valve of claim 8, wherein the selector comprises a first locking lug indicating the meter position and defining a first locking aperture, a second locking lug indicating the bypass position and defining a second locking aperture, and a third locking lug indicating a shutoff position and defining a third locking aperture; wherein the meter position of the first locking lug is rotationally offset from the bypass position of the second locking lug, and the bypass position of the second locking lug is rotationally offset from the shutoff position of the third locking lug.

11. The bypass valve of claim 8, wherein:
the selector defines a planar selector sealing surface positioned in sealing engagement with the base;
the selector defines a primary passage bore extending into a selector sealing surface to a primary passage; and
the selector defines a secondary passage bore extending into the selector sealing surface to a secondary passage.

12. The bypass valve of claim 11, wherein:
the selector is rotatable relative to the base about a fastener that defines a rotational axis;
the upstream utility bore defines a parallel axis relative to the rotational axis; and
the parallel axis of a utility bore, and the rotational axis of the fastener, are each perpendicular to the selector sealing surface.

13. The bypass valve of claim 11, wherein:
the base defines a planar base sealing surface positioned in sealing engagement with the planar selector sealing surface; and
the planar base sealing surface is parallel to the planar selector sealing surface.

14. The bypass valve of claim 8, wherein the selector is rotatable relative to the base about a fastener that defines a rotational axis, and the upstream utility bore defines a parallel axis relative to the rotational axis.

15. The bypass valve of claim 14, wherein:
the selector defines a primary passage bore connected in fluid communication with a primary passage;
the primary passage bore defines a primary passage bore axis; and
the primary passage bore axis is parallel to the rotational axis.

16. A method for routing a fluid flow through a utility metering system comprising:
positioning a selector of a bypass valve in a meter position, a meter inlet of a meter connected in fluid communication with a meter inlet bore defined by a base of the bypass valve, a meter outlet of the meter connected in fluid communication with a meter outlet bore defined by the base, and in the meter position, the selector connects the meter inlet bore in fluid communication with the meter outlet bore; and
rotating the selector relative to the base to position the selector in a bypass position.

17. The method of claim 16, further comprising removing a meter from the bypass valve when the selector is rotated into the bypass position.

18. The method of claim 16, wherein the base is at least partially positioned within a selector recess defined by the selector, and rotating the selector relative to the base rotates the selector recess to position the selector in the bypass position.

19. The method of claim 16, wherein:
the base defines a base sealing surface;
the selector defines a selector sealing surface positioned in sealing engagement with the base sealing surface and a selector seal forms a seal between the base sealing surface and the selector sealing surface;
the selector defines a primary passage bore extending into the selector sealing surface and connecting in fluid communication with a primary passage; and
the selector defines a secondary passage bore extending into the selector sealing surface and connecting in fluid communication with a secondary passage.

20. The method of claim 19, wherein the selector sealing surface is planar and the base sealing surface is planar, and a planar base sealing surface is parallel to a planar selector sealing surface.

\* \* \* \* \*